US012031042B2

(12) United States Patent
Grzybowski (10) Patent No.: US 12,031,042 B2
(45) Date of Patent: *Jul. 9, 2024

(54) RECYCLED OIL AND RUBBER MODIFIED FOR ASPHALT AND METHOD OF USE

(71) Applicant: Kenneth Grzybowski, Tampa, FL (US)

(72) Inventor: Kenneth F. Grzybowski, Tampa, FL (US)

(73) Assignee: Kenneth Grzybowski, Tampa, FL (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/193,360

(22) Filed: Mar. 5, 2021

(65) Prior Publication Data

US 2021/0189133 A1  Jun. 24, 2021

Related U.S. Application Data

(63) Continuation of application No. 15/915,571, filed on Mar. 8, 2018, now Pat. No. 10,941,296, which is a
(Continued)

(51) Int. Cl.
*C08L 95/00* (2006.01)
*C08K 3/08* (2006.01)
(Continued)

(52) U.S. Cl.
CPC ............... *C08L 95/00* (2013.01); *C08K 3/08* (2013.01); *C08K 3/10* (2013.01); *C08K 3/32* (2013.01);
(Continued)

(58) Field of Classification Search
CPC .......... C08L 95/00; C08L 91/06; C08K 3/08; C08K 3/10; C08K 3/32; C08K 5/01;
(Continued)

(56) References Cited

U.S. PATENT DOCUMENTS 4,054,512 A    10/1977  Dugan et al.
5,904,760 A  *  5/1999  Hayner ............... C09D 195/00
                                                              524/68
(Continued)

FOREIGN PATENT DOCUMENTS

WO            9735940 A1    10/1997

OTHER PUBLICATIONS

Virginia Department of Transportation. Chapter 1: Components of Asphalt Concrete. www.virginiadot.org/business/resources/bu-mat-chapt1ap.pdf.
(Continued)

*Primary Examiner* — James E Mcdonough
(74) *Attorney, Agent, or Firm* — McCarter & English, LLP (57) ABSTRACT

A asphalt binder modifier or a stand-alone asphalt binder and the method of making the asphalt binder or binder modifier are disclosed. The asphalt modifier or binder consisting of treated re-refined engine oil bottoms/VTB's treated by injecting air into re-refining engine oil bottoms/VTB's at temperatures between 150° F. and 550° F. The re-refined engine oil can be processed with ground tire rubber. The binder modifier was blended with various paving and roofing asphalts to form performance-enhanced modified asphalt binders used in paving, roofing, and industrial products.

18 Claims, 1 Drawing Sheet

Related U.S. Application Data continuation of application No. 14/628,893, filed on Feb. 23, 2015, now Pat. No. 9,944,796.

(60) Provisional application No. 61/942,874, filed on Feb. 21, 2014.

(51) Int. Cl.
*C08K 3/10* (2018.01)
*C08K 3/32* (2006.01)
*C08K 5/01* (2006.01)
*C08L 91/06* (2006.01)
*C10C 3/04* (2006.01)
*C10G 27/04* (2006.01)

(52) U.S. Cl.
CPC ............... *C08K 5/01* (2013.01); *C08L 91/06* (2013.01); *C10C 3/04* (2013.01); *C10G 27/04* (2013.01); *C08K 2003/0856* (2013.01); *C08K 2003/0893* (2013.01); *C08K 2003/329* (2013.01)

(58) Field of Classification Search
CPC .... C08K 2003/0856; C08K 2003/0893; C08K 2003/329
USPC ...................................... 106/273.1, 279, 280
See application file for complete search history.

(56) References Cited

U.S. PATENT DOCUMENTS

| | | | |
|---|---|---|---|
| 5,959,007 | A | 9/1999 | Liang |
| 7,202,290 | B2 | 4/2007 | Stuart et al. |
| 7,900,266 | B1 | 3/2011 | Longcor, IV |
| 9,944,796 | B1 * | 4/2018 | Grzybowski ............. C10C 3/04 |
| 10,941,296 | B1 * | 3/2021 | Grzybowski ............. C08K 3/08 |
| 2011/0269876 | A1 | 11/2011 | Rowe et al. |
| 2013/0261232 | A1 | 10/2013 | Barnat et al. |

OTHER PUBLICATIONS

Vazquez-Duhalt, Environmental impact of used motor oil. Sci Total Envir. 1989;79:1-23.

Agency for Toxic Substances and Disease Registry, Toxicological profile for used mineral-based crankcase oil. 1997; U.S. Dept Health Human Svcs, Public Health Svc, Atlanta, GA.

Dominguez-Rosado & Pichtel, Chemical characterization of fresh, used and weathered motor oil via GC/MS, NMR and FTIR techniques. Proc Indiana Acad Sci. 2003; 112(2):109-116.

McDaniel & Shah, Asphalt Additives to Control Rutting and Cracking). Publication: FHWA/IN/JTRP-2002/29. Joint Transportation Research Program: Indiana Department of Transportation and Purdue University; West Lafayette, Indiana 2003.

Raymond, et al., Oil degradation in soil. App Envir Microbiol. 1975; 31:522-35.

Jia, et al. Infrared spectra and rheological properties of asphalt cement containing waste engine oil residues. Construction and Building Materials 50 (2014) 683-691.

DeDene, Christopher. Investigation of using waste engine oil blended with reclaimed asphalt materials to improve pavement recyclability. Dissertations, master's theses and master's reports. Michigan Technological University, 2011.

* cited by examiner

RECYCLED OIL AND RUBBER MODIFIED FOR ASPHALT AND METHOD OF USE

This application claims priority under 35 U.S.C. § 120 to U.S. patent application Ser. No. 15/915,571 titled "Recycled Oil and Rubber Modified Asphalt and Method of Use" filed on Mar. 8, 2018, which claims U.S. patent application Ser. No. 14/628,893 filed on Feb. 23, 2015, now U.S. Pat. No. 9,944,796, which claims the benefit of Provisional Patent Application No. 61/942,874 filed on Feb. 21, 2014, the entire contents of each of which are hereby incorporated by reference.

FIELD OF INVENTION

This invention relates to asphalt treatments. Specifically, the invention discloses a composition and method for modifying asphalt/bitumen products using recycled or re-refined engine oils and additives and/or modifiers.

BACKGROUND OF INVENTION

The asphalt used for paving and industrial uses is a solid or semi-solid bituminous material that is either naturally occurring, or derived from petroleum refining processes and includes paraffinic and aromatic hydrocarbons and heterocyclic compounds. Constituents of the binder, for example those seen in Table 1, vary based on the required characteristics and available binder material.

TABLE 1

Typical Constituents of Asphalt Binders.

| Type of Constituent | | Examples |
|---|---|---|
| Extenders | | sulfur, lignin, petroleum, vegetable oils |
| Modifiers | Elastomers | natural latex, synthetic latex, block co-polymers, reclaimed rubber, natural rubber, styrene-butadiene, SBR, styrene-butadiene-styrene, SBS, crumb rubber/ground tire rubber |
| | Plastomers | polyethylene, polypropylene, ethyl-vinyl-acetate, EVA, polyvinyl chloride, PVC |
| Anti-Oxidants | | manganese salts, lead compounds, carbon black, calcium salts |
| Anti-Strip Agents | | amines, lime |
| Petroleum Distillate | | recycled and rejuvenating oils, kerosene, naphtha, low volatile-high flash point oils, mineral spirits |

In paving, mineral aggregates such as crushed stone are typically mixed with asphalt materials, producing pavement-type products suitable for vehicular or related traffic, such as those seen in Table 2. In addition to asphalt use in road and highway applications, asphalt is a commonly used material for construction purposes, such as roofing materials, water and damp-proofing products, bridge decks, racetracks, airport runways, parking lots, bicycle paths, and port facilities. Asphalt alone, however, often does not possess all the physical characteristics desirable for many construction purposes.

TABLE 2

Typical Constituents of Asphalt Concrete Used in Pavement Applications.

| Type of Constituent | Examples |
|---|---|
| Aggregate Material | mineral aggregates, crushed concrete, fly ash, sand, gravel, crushed stone, slags, screenings, recycled asphalt pavement, recycled asphalt shingles |
| Binders | bitumen/asphalt |
| Additives | cellulose fibers, synthetic mats and grids |

The performance required of any asphalt material is determined by its end use and/or application and is gauged by one or more measurable properties. For example, asphalt materials used in the roofing context must be designed to perform several, somewhat diverse functions. In order to saturate and impregnate an organic fiberglass mat, polyester mats, or comparable base materials, roofing asphalt must be very fluid at processing temperatures. Once applied as part of a roofing material, including shingles, roofing, underlayment and various membranes, the asphalt should also retain its durability and/or weather resistance over a wide range of climatic conditions.

For instance, unmodified asphalt may exhibit a poor Performance Grade Rating (PG Rating) as a pavement binder for pavements designed for high vehicular traffic or loading or severe climate zones. Although the PG Rating for asphalt may widely vary, asphalt generally used in road pavement applications for standard vehicular use and moderate climate, exhibit PG Ratings of about 64-22, which indicates a 64° C. average, seven-day maximum and a −22° C., single day minimum pavement design temperature. When used as a road pavement material, asphalt is typically subjected to temperatures in excess of 64° C. measured twenty mm below the pavement surface and below −22° C. at the pavement surface. Temperatures and traffic conditions outside the pavement design range lead to enhanced deterioration of the asphalt pavement. Hence, it has, for some time, been an objective to broaden the PG Rating range of asphalt used in road-pavement applications; which is typically referred to as the useful temperature range.

The most common type of paving composition in the United States is hot mix asphalt (HMA), which is a preselected mixture of mineral aggregate and asphalt, commonly referred to as Mix Designs. There are numerous mix designs used to meet climatic conditions and vehicular traffic. The mineral aggregate particle size gradation and asphalt type providing the optimum set of performance properties is referred to as the Job Mix Formula, of which there are numerous variations to satisfy the requirements of the pavement to include: vehicular traffic, climate conditions, and useful life expectancy.

To broaden the PG range of the asphalt pavement, modifiers and additives are added to the asphalt. In addition to increasing the PG range of the asphalt, modifiers also can improve other qualities of the asphalt, such as its toughness, flexibility and durability characteristics, such as: resistance to oxidative aging (weathering), resistance to moisture, and improved adhesive properties. Typically, modifiers such as elastomeric and/or plastomer type polymer modifiers are added to molten asphalt and mixed for minutes to hours to produce a modified asphalt, commonly referred to as PMA, polymer-modified asphalt, or PMB, polymer-modified bitumen. Cross-linking agents may be concurrently added to the mix or added post-processing. For paving, the modified-asphalt is then routed to a mixer where aggregate is added to produce the hot mix asphalt (HMA). The hot mix asphalt is then taken to the construction site for use in paving equipment.

In roofing, the PMA/PMB is referred to as modified-bitumen compound, typically combined with mineral filler in batches and/or a continuous mixer. The filled modified-bitumen compound is then routed to the production line to make various products.

Some major problems associated with the performance of hot mix asphalt (HMA) pavements can be moisture susceptibility (stripping), permanent deformation (rutting), bleeding, shoving, and cracking (thermal and fatigue). The asphalt binder is selected for the paving environment to provide sufficient stiffness to resist rutting at expected high service temperatures and enough flexibility to resist fatigue and thermal cracking at intermediate and low service temperatures. However, the wider the range of temperatures at which a binder must perform, the more difficult it is to span the range with an unmodified binder. There are a number of modifiers and/or additives that can be added to the HMA mixture that each address one or more of the aforementioned problems.

For example, liquid anti-strips and hydrated lime are additives that can be used to reduce moisture susceptibility problems. They alter the surface chemistry at the interface between the aggregate and the asphalt resulting in an improved bonding of the asphalt and aggregate. Polymers can be used to modify an asphalt to increase the high temperature stiffness of the HMA, which can reduce the probability of rutting, bleeding, and shoving. Polymers may be added to improve adhesion and cohesion properties. Polymers may be added to improve asphalt's service life. Polymers may be selected and used to impart elastomeric properties which can reduce thermal and fatigue cracking by allowing the modified asphalt to undergo repeated strains with recovery. Oils and extenders may be added to improve low or cold temperature properties.

Current paving methods in the United States use a hot asphalt mix that involves melting the asphalt in a large heated tank and adding 1 to 8 percent of an elastomer (Grzybowski, et al, U.S. Pat. No. 7,202,290). Typically, high dosages of elastomer are used globally, usually as a synthetic rubber such as styrene butadiene styrene block co-polymer (SBS). The SBS block co-polymer dissolves slowly in the asphalt due to viscosity differences when only stirring is used. The addition of the elastomers and other polymers is typically accomplished by first pre-mixing the modifier and heated asphalt in a heated tank, referred to as a wetting tank. The mixture is then pumped into and through a high shear mill, if needed, until the modifier/polymer is of suitable size for dissolution. The process is repeated where the modifier/polymer requires additional processing to form suitable sized material. The mixture is then pumped into an agitated curing tank to complete the solvation of the modifier. At this stage, a cross-linking agent may be employed to enhance the properties of the modified binder.

After the elastomer has dissolved, a cross-linking agent, such as sulfur in various forms, peroxide, or a transition metal can be added to cross-link the elastomer, which reduces the amount of elastomer and permits use of lower or higher molecular weight elastomers for the same end point. Adding the cross-linking agent, sulfur, at the same time as the SBS block co-polymer, results in immediate and localized cross-linking, which may manifest itself as agglomerated SBS clumps that do not dissolve easily and can require future blending/milling. If the cross-linking agent is added too soon to the mix, before the rubber has dissolved, an intractable mass of rubber is formed which is not dissolvable. If the cross-linking agent is added late, both time and money are then wasted. Further, extended exposure of asphalt to high temperatures affects the viscosity and characteristics of the asphalt binder. Hence, the addition of the cross-linking agent is critical to the correct make up and economics of the asphalt hot mix.

Asphalt extenders and/or additives, such as RREO and high flash oils, are used to lower asphalt's viscosity, improve selected performance properties, and improve low temperature properties. Other modifications, for example, inclusion of vegetable oil (Grzybowski, et al, PCT/US1997/004874) provide for improved low temperature performance of asphalt compositions. In particular, the vegetable oil, such as corn oil, peanut oil, sunflower oil, soybean oil, or a combination thereof, is present at a concentration of about 1.0 to about 6.0 weight percent as compared to the cement binder.

A study on Indiana highways showed styrene butadiene rubber (SBR), styrelf (PAC), and asphalt rubber (AR) performed well after 11 years (McDaniel & Shah, *Asphalt Additives to Control Rutting and Cracking*). Publication: FIHWA/IN/JTRP-2002/29. Joint Transportation Research Program: Indiana Department of Transportation and Purdue University; West Lafayette, Indiana 2003). High temperature binder testing revealed that all of the selected modifiers stiffened the binder, which relates to pavement rutting.

The use of ground tire rubber (GTR)/crumb rubber (CR) in asphalt, i.e. bitumen, as a binder modifier when added to asphalt in particulate form without extensive processing results in an unstable mixture due to only partial dissolution, which upon storage at normal temperatures of 250° F.-400° F., separates with the GTR settling out of solution.

Additives and/or modifiers may improve singularly the high temperature properties or low temperature properties, provide elastomeric properties, adhesive properties, or anti-aging. However, no single modifier exists that addresses the multitude of asphalt application and aging issues or provides combined benefits of high and low temperature properties. As such, there is an unmet need to provide novel compositions of asphalt that possess enhanced aging and temperature tolerance properties.

SUMMARY OF THE INVENTION

The present invention relates to asphalt compositions having enhanced aging and temperature tolerance through use of processed re-refined engine oils (RREO), singularly or together with ground tire rubber (GTR), as an additive/modifier.

Used re-refined engine oil has properties similar to Heavy Vacuum Gas oil produced from crude oil distillation. Re-refined engine oil may contain wear metals, such as calcium, zinc, iron, sodium, molybdenum and/or phosphorous. The re-refined engine oil is converted into a viscous binder or binder modifier when oxidized at the temperatures disclosed herein. RREO is further defined with ASTM D 93, PMCC Flash Points>400° F., ASTM D 482, Ash Content of 2-9%, EN 12606-1, Wax Contents<0.1%, ASTM D 7169, Simulated Distillations exhibiting IBP's 700° F.-800° F., 50% off of 850-1,050° F. and FBP of ≥125° F. Useful sources of used engine oil include re-refined engine oil, re-refined engine oil vacuum tower bottoms, collected and dehydrated used engine oil or combinations of these. Upon processing, the binder/binder modifier has a softening point of at least 200° F. and consistent penetration values that vary by 75 decimillimeters or less when measured at about 39° F. and about 115° F. Exemplary temperatures, without limiting the invention include, 39.2° F., 40° F., 45° F., 50° F., 55° F., 60° F., 65° F., 70° F., 75° F., 80° F., 85° F., 90° F., 100° F., 105° F., 110° F. and 115° F. Exemplary softening point temperatures include 200° F., 208° F., 210° F., 212° F., 215° F., 220° F., 225° F., 230° F., 235° F., 240° F., 242° F., 245° F., 250° F.

In some variations, the used engine oil contains wear metals, such as zinc, copper, iron and molybdenum, and nickel, which are incorporated into the binder/binder modifier. Typical ranges for wear metals are seen in Table 3. In specific variations, the zinc is between about 480 mg/kg and about 1500 mg/kg or the nickel is about 1 mg/kg. For example, zinc levels can be 480 mg/kg, 500 mg/kg, 550 mg/kg, 6000 mg/kg, 650 mg/kg, 700 mg/kg, 750 mg/kg, 800 mg/kg, 850 mg/kg, 900 mg/kg, 950 mg/kg, 1000 mg/kg, 1050 mg/kg, 1100 mg/kg, 1150 mg/kg, 1200 mg/kg, 1250 mg/kg, 1300 mg/kg, 1350 mg/kg, 1400 mg/kg, 1450 mg/kg, or 1500 mg/kg.

TABLE 3

Breakdown of wear metals commonly found in re-refined and used engine oil that may be used in the invention.

| Wear Metal | Concentration Range |
| --- | --- |
| Al | 140 ± 50 ppm |
| Cr | 0-25 ppm |
| Fe | 500-1,000 ppm |
| Cu | 100-150 ppm |
| Pb | 50-150 ppm |
| Ma | 250-400 ppm |
| Ni | 0-25 ppm |
| Mn | 0-50 ppm |
| Ag | 0-25 ppm |
| Ti | 0-50 ppm |
| K | 600-1,000 ppm |
| Br | 100-200 ppm |
| Si | 150-250 ppm |
| Na | 1,000-2,000 ppm |
| Ca | 8,000-15,000 ppm |
| Mg | 500-1,000 ppm |
| P | 2,000-5,000 ppm |
| Zn | 3,000 5,000 ppm |
| Ba | 0-50 ppm |
| Cr | 0 50 ppm |

In some embodiments, the binder/binder modifier is further processed to include ground tire rubber/crumb rubber blended with the used engine oil or oxidized used engine oil. Additional components can be added, such as asphalt modifiers or asphalt additives. Non-limiting examples of asphalt modifiers or asphalt additives include elastomers, plastomers, waxes, polyphosphoric acid, other acids, such as sulfuric acid, amines, such as amide-diamine, phosphate esters, Hydrolyene aromatic oil, extender oils, asphalt sand, or combinations thereof. Non-limiting examples of elastomers are styrene-butadiene-styrene, styrene-butadiene rubber, styrene-butadiene polymer, or reactive polymers, such as DuPont's Elvaloy® RET ter-polymers; or plastomers such as polyethylene, ethylene-vinyl-acetate, or APO, amorphous polyolefin, co-polymers either as single modifier and/or blends of both. Ter-polymers, and non-limiting examples of plastomers are polyethylene, ethylene-vinyl-acetate, and APP, attatic polypropylene. In some variations, the ground tire rubber comprises about 0.1 to 60 weight percent of the binder/binder modifier. For example, the ratio of the used engine oil or oxidized used engine oil (collectively RREO) to ground tire rubber/crumb rubber (GTR) is optionally 95 wt. % RREO to 5 wt. % GTR, 90 wt. % RREO to 10 wt. % GTR, 80 wt. % RREO to 20 wt. % GTR, 70 wt. % RREO to 30 wt. % GTR, 60 wt. % RREO to 40 wt. % GTR, or 50 wt. % RREO to 50 wt. % GTR. Additional modifiers or additives are optionally included with ground tire rubber.

The binder or binder modifier is optionally added to asphalt, polymer-modified asphalt, emulsions, cutback asphalt, roofing flux, shingle coating or modified bitumen roofing compound. In specific variations, the binder or binder modifier is added at about 0.1 to about 60 weight percent to the asphalt, polymer-modified asphalt, emulsion-based asphalt, cutback based asphalt, roofing flux, shingle coating or modified bitumen roofing compound.

A method of manufacturing a binder/binder modifier is disclosed. A used engine oil, such as re-refined engine oil, re-refined engine oil vacuum tower bottoms, or collected and dehydrated used engine oil (collectively RREO), is oxidized. The RREO is heated to a temperature of about 150° F. to about 550° F. or to 50° F. below the flash point of the RREO, and then mixed while air was injected into the RREO. Exemplary temperatures, without limiting the invention include, 150° F., 160° F., 170° F., 180° F., 190° F., 200° F., 210° F., 220° F., 230° F., 240° F., 250° F., 260° F., 270° F., 280° F., 290° F., 300° F., 310° F., 320° F., 330° F., 340° F., 350° F., 360° F., 370° F., 380° F., 390° F., 400° F., 410° F., 420° F., 430° F., 440° F., 450° F., 460° F., 470° F., 480° F., 490° F., 500° F., 510° F., 520° F., 530° F., 540° F., 550° F. Non-limiting examples of injection rates include 0.1 L/min/kg to 2 L/min/kg. The RREO is allowed to oxidize until a predetermined elastic modulus is achieved. Optionally, the binder/binder modifier is then maintained a temperature of about 150° F. to about 550° F., such as the values outlaid above.

In some variations of the invention, ground tire rubber is added to the RREO, and the ground tire rubber and RREO mixed to incorporate the ground tire rubber.

By blending the GTR in the RREO at an elevated temperature and injecting air, two events occur. The GTR particles are reduced in size, dramatically increasing the surface area which exposes non-vulcanized sites for subsequent reaction, while releasing the crumb rubber's (CR's) oils and carbon black. The oils reduce the asphalt's viscosity, improving the low temperature properties and the carbon black improves resistance to oxidative aging and provides a degree of toughness via fine particulate reinforcement. While this is occurring, the RREO is undergoing an oxidative reaction with the wear metals acting as a catalyst and the viscosity increases, forming a paste-like consistency of grease in some instances. The increase in RREO viscosity compensates for the reduction in viscosity caused by the GTR and provides a modifier system which improves both high and low temperature properties and further eliminates GTR settling. The binder modifier is optionally mixed using a paddle, high shear mixer, high speed circulation, or combination thereof. In specific variations, the binder modifier is mixed for about 30 minutes to about 48 hours.

In some embodiments, the RREO is blended with an asphaltic binder, such as asphalt, polymer-modified asphalt, emulsion-based asphalt, cutback-based asphalt, roofing flux, shingle coating, or modified bitumen roofing compound. The binder's liquid asphalt component may originate from various sources, such as naturally occurring asphalt, a refined crude oil, or asphaltite. The asphalt binder may also be processed into an asphalt cutback or emulsion to allow processing asphalt products at ambient conditions without the use of heat. The binder, i.e. asphaltic material and binder modifier (RREO or RREO and GTR) are optionally mixed prior to incorporation of aggregate to produce a final pavement product.

The binder is optionally about 0.1 to about 90 weight percent of the end product, depending on the use as a paving, roofing, or industry application. The processed RREO with or without GTR may constitute 1-50 weight percent of the asphalt portion of the binder. The processed RREO may contain GTR in concentrates from 0.1 to approximately 60 weight percent. For example, the RREO-based binder modifier can be mixed at weight proportions of 2.5 wt. %, 5 wt. %, 7.5 wt. % or 10 wt % with the asphaltic binder. The inclusion of GTR further enhances the processed RREO by enhancing low temperature properties, adding an anti-aging compound, carbon black, and provides elastomeric properties gained from the rubbers.

The processing of RREO–GTR combination at elevated temperatures is important to obtain a viable product with multiple performance benefits. The processing may be performed with or without shear mixing or with or without oxygen present.

Four prime parameters optimize the potential benefits, GTR particle size, temperature, time of mixing, and degree of shear imparted during mixing/blending.

The invention improves performance properties of the re-refined engine oil, along with cost-effective polymer modification through use of re-refined engine oil and GTR, which are both recycled materials. The methodology results in an asphalt modification technology which is stable, homogenous, easy to use via liquid-liquid blending and transportable in bulk as a liquid. When added to asphalt, the performance properties of the host asphalt are improved and do not exhibit the standard issues (reduced elastic modulus and/or GTR settling) when using GTR and/or RREO when added separately or in an unreacted state.

Further, the invention provides efficient and increased use of two sustainable materials, GTR and re-refined engine oil bottoms (RREO). Thus, it provides a value-added modifier for asphalts using sustainable/recycled materials that result in improved and optimized performance properties of the host asphalt without any of the current issues of GTR separation and/or loss of elastic modulus. It also provides a modifier that improves both the high and low performance properties of the host asphalt, while adding elastomeric, adhesive, improved low temperature stiffness/flexibility and anti-aging properties.

DETAILED DESCRIPTION OF THE PREFERRED EMBODIMENT

Figure 1:
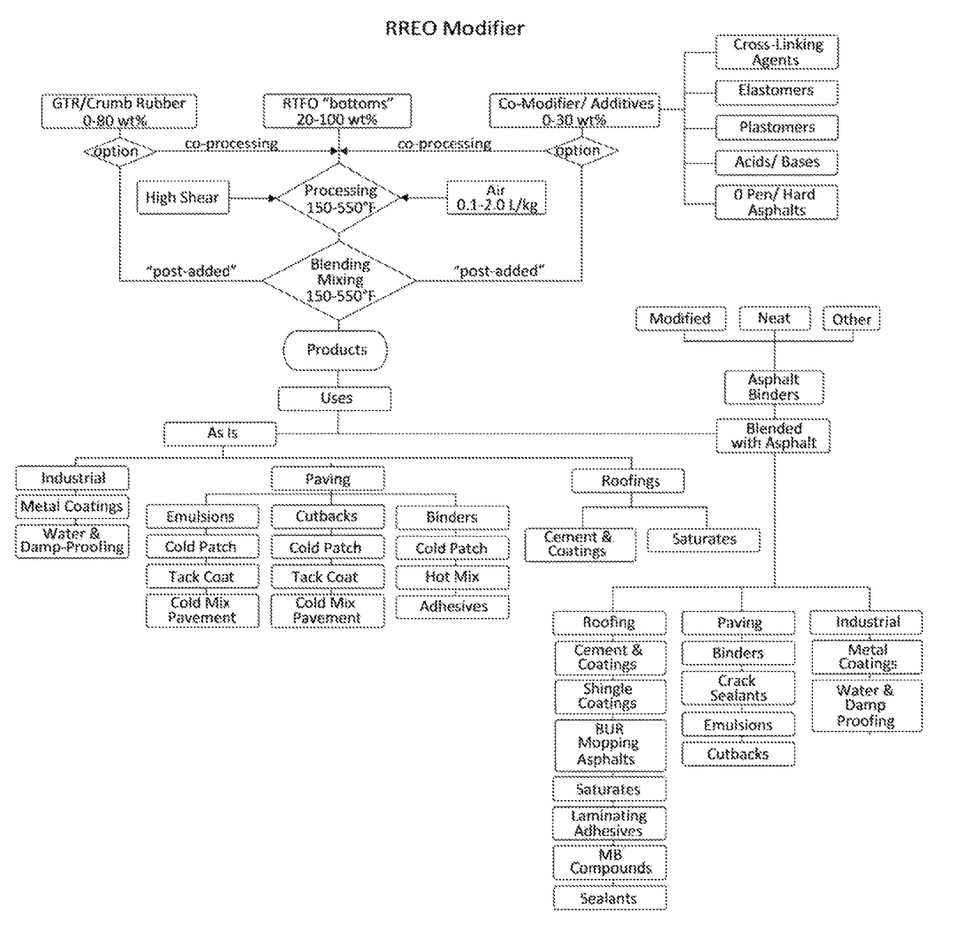
FIG. 1 is a flow diagram describing preparation of the RREO modifier and the more common possible uses in paving, roofing, and industrial products containing asphalt.

For a fuller understanding of the invention, reference should be made to the following detailed description, taken in connection with the accompanying drawing.

As used herein, "about" means approximately or nearly and in the context of a numerical value or range set forth means±15% of the numerical.

As used herein, "substantially" means largely if not wholly that which is specified but so close that the difference is insignificant.

As used herein, "PG Rating" is defined as the average seven-day maximum and the single-day minimum pavement design temperature, wherein the maximum is determined 20 mm below the surface of the pavement and the minimum is determined at the surface of the pavement.

Processed re-refined engine oil (RREO) vacuum tower bottoms were treated and combined with GTR particles at elevated temperatures and mechanical mixing at either high or low shear, resulting in a stable homogeneous mixture that is resistant to settling, and which provides performance enhancing properties to the re-refined engine oil. Specifically, the admixture exhibits higher elastic modulus at high temperatures and improved low temperature properties. When the admixture of RREO and GTR is combined with asphalt, the performance properties of the asphalt are dramatically improved. The asphalt exhibits elastomeric properties: improved weathering, adhesion, viscosity, resistance to water, improved low temperature properties (Creep Stiffness and/or Flexibility), anti-aging properties, and improved adhesive properties. The degree of property improvement possible is dependent upon the composition and processing of the GTR—Re-refined Engine Oil mixture, the host asphalt and the means of combining the RREO–GTR admixture with asphalt.

GTR is processed to access the oils, uncross-linked polymer sites and carbon black contained in the material. Access to uncross-linked polymer sites requires minimizing particle size, i.e. maximizing access to any uncross-linked polymer sites. However, conventional GTR processing results in particles that either are suspended in a binder or settle out of the binder, and therefore fails to optimize the access to un-cross-linked polymer sites. Further, such processing fails to dissolve the GTR into a homogeneous mixture, which improves binder properties, such as binder stability over time.

The GTR-RREO admixture is a combination of ground tire rubber (GTR) and re-refined engine oils, RREO's, in various ratios processed in a mixing vessel employing paddle and/or high shear and/or circulation with or without the presence of incorporated air at temperatures from 150° F. to 550° F. with mixing/blending times of 30 minutes to 48 hours to produce a homogeneous mixture of finely dispersed GTR particles in the re-refined engine oil bottoms (VTB's). The processing procedures are summarized in a flow diagram seen in FIG. 1.

The admixture provides a means to use recycled products, RREO and GTR, in asphalt products to assist in satisfying various "green programs," reducing carbon footprints, and achieving higher degrees of sustainability. Further, compositions of RREO and GTR disclosed herein may provide 60% to 80% of the elastomeric properties of traditional binder elastomer additives like styrene-butadiene-styrene, styrene-butadiene rubber, and styrene-butadiene polymer, but without the cost and in a more environmentally-friendly manner.

Example 1

Re-refined engine oil vacuum tower bottoms were collected from the re-refining of engine oil using a thin/wiped film evaporator, such as those provided by LUWA and Artisan Industries. Properties for the RREO before and after processing are provided in Table 4. It is noted that conventional distillation of oil is not a preferred method of re-refining for various reasons. The collected RREO was transferred to a mixing vessel or tank having a continuous circulation loop equipped with heating mechanisms utilizing hot oil or steam traced tubes, fire tubes, electric plates, or other methods of heating practiced in the industry. The tank was optionally equipped with internal and/or external circulation, internal mixing and/or external circulation through a high shear mill. The RREO was mixed while air was injected at 0.1-2 L/min./kg, and dispersed, into the liquid RREO at temperatures ranging from 150° F.-550° F., resulting in a product having a high viscosity, such as a shear susceptible homogeneous paste-like material analogous to grease. Re-refined engine oil oxidation levels are measured and controlled by altering the time, from 1 to 24 hours, temperature, and amount of air injected into the re-refined engine oil. Injected air is dispersed within the tank using sparger tubes, and impellers designed to generate fine bubbles in the processed liquid, i.e., RREO. To optimize oxidation time, air is injected as small bubbles. Additionally, use of long volatile stills can also increase control time. It is preferred that the RREO is oxidized at 1-3 L/min/kg of product. However, lower oxidation levels can be utilized, as well as higher oxidation levels. Of particular note, higher oxidation levels must be considered in light of increased effluent carry-over of oils, and a balancing of oxidation to oil carry-over must be considered. Such balancing is within the capability of one skilled in the art. Coalescence is minimized and dwell/contact time optimized as is known in the art. The consistency/viscosity of the final product is dependent on the RREO oxidation levels, and the degree of contact with air. Optionally, the RREO is heated to and maintained at a temperature of 300° F.-550° F.

An alternate method of introducing the air is the employment of a high shear mixer capable of creating a vortex. The vortex pulls air into the liquid mixture, enabling an oxidative reaction with reduced emissions. Industry standard mixers exhibiting suitable mechanics to create a vortex are: Cowles, Greerco, Silverson, Cady, and others.

The vessel, tanks and/or circulation loop may be equipped with high or low shear mixing, air injection, baffles and/or other mechanical means to facilitate the blending/mixing and reaction process.

The consistency of the RREO is adjusted by adjusting the parameters of temperature, air contact time, air dispersion, and air to RREO ratios.

When RREO and GTR are jointly processed, in addition to the aforementioned parameters, internal and external circulation optimally incorporating a shear mill or digestion system facilitates the GTR size reduction. Reduced particle sizes are achievable.

Examples 1-3 represent re-refined engine oils from three separate sources from different regions within the United States. Each was subjected to laboratory processing at 500±10° F. from 4.5 to 9.0 hours. The processing time represents the time required to achieve a targeted Softening Point in the range of approximately 210° F.-240° F. The process involved: internal high shear mixing by a Silverson laboratory mixer and simultaneous injection of air. A nitrogen blanket was injected on the surface of the mixing vessel to provide an inert atmosphere and therefore enhance the safety of the process.

Example 1 demonstrates the feasibility to alter and control the rheological profile and physical properties of the base re-refined engine oil by combining the RREO with air (oxygen). Testing of the resulting product showed significant increase in viscosity with consistent characteristics over a wide range of temperatures, as seen in Table 4. These properties are highly beneficial in paving, roofing, and industrial products. The properties facilitate processing, while reducing (based on use level) the thermal susceptibility, gaining more flexibility in cold temperatures and adding stiffness at high temperatures of the host product if used as an additive to neat, modified, or filled asphalts.

TABLE 4

Results of Oxidation of RREO from Supplier (located in the Midwest)

| Properties | | ASTM Test Method | Results | Comments |
|---|---|---|---|---|
| Mixing Process | | | | |
| Temperature, ° F. | | Probe | 500 ± 10 | PRI procedure, Silverson |
| Time, hours | | To targeted end point | 7 | laboratory high shear mixer |
| RREO Before Processing | | | | |
| Flash Point, COC, ° F. | | D 92 | 510 | Flash Points differences by |
| Flash Point, PMCC, ° F. | | D 93 | 460 | Test Method |
| Composition, Component Fractions, % | Asphaltenes | D 4124 via Iatroscan | 12.5 | Typical composition of RREO based on types, grades and |
| | Polar Aromatics | | 25.5 | proportions of in-feed engine oils |
| | Naphthene Aromatics | | 0.0 | |
| | Saturates | | 62.0 | |
| Softening Point, ° F. | | D 36 | <60 | Approximately a high viscosity |
| Penetration, dmm | 39.2° F. | D 5 | <300 | semi-solid |
| After Processing | | | | |
| Softening Point, ° F. | | D 36 | 212 | Targeted SP meets shingle coating requirements |
| Penetration, dmm | 39.2° F. | D 217 | 257 | Exhibits a highly desired uniform |
| | 77° F. | | 282 | consistency, which exhibits |
| | 115° F. | | 295 | minimal change with temperature |
| Solubility, TCE, % | | D 2042 | 100 | Homogeneity, purity |
| Rotational Viscosity, 300° F., cps | 10 rpm | | 14,750 | Material exhibits shear |
| | 50 rpm | D 4402 | 4,050 | susceptibility. Provides advantages |
| | 100 rpm | | 2,300 | during subsequent processing |

TABLE 4-continued

Results of Oxidation of RREO from Supplier (located in the Midwest)

| Properties | | ASTM Test Method | Results | Comments |
|---|---|---|---|---|
| Separation, 163° C., 48 hrs, SP, ° F. | Top ⅓ Bottom ⅓ Difference, ° F. | D 7173/ D 36 | 197.6 195.8 1.8 | Demonstrates homogeneity and stability |
| DSR, G*/sinδ, kPa | 106° C. 100° C. 94° C. | D 7175 | 1.550 1.770 2.000 | Material classifies as a PG 112-XX if used in paving |

In asphalt derived from refining crude oil, all four component fractions are present, Asphaltenes (A), Polar aromatics (PA), Naphthene aromatics (NA), and Saturates (S). When oxidized, the NA's converted to PA's and the PA's converted to A's, such that the resultant rheological profile reflects a stiffer material exhibiting a higher Softening Point (SP) accompanied by lower Penetrations. For example, a 200° F.-220° F. Softening Point would exhibit a 12-26 dmm Penetration at 25° C.; ≤8 dmm at 4° C., and ≤75 dmm at 46° C.

Without being bound to any specific theory, it is hypothesized the wear metals indigenous to RREO's are a prime contributor to the processed properties. Useful wear metals include zinc, copper, iron and molybdenum, and nickel. Some exemplary metals, and their respective amounts, are shown in Table 5.

TABLE 5

Listing of some common wear metals found in used engine oils.

| Name of study testing | Amount of wear metals found in various used engine oils, mg/kg | | | | | |
|---|---|---|---|---|---|---|
| used engine oil | zinc | nickel | copper | chromium | iron | lead |
| Rosado & Pichtel[1] | 838.0 | N/A | N/A | N/A | N/A | 110.0 |
| Raymond, et al.[2] | 1500 | N/A | 17 | 21 | 260 | 7500 |
| Cotton, et al.[3] | 2500 | N/A | 56 | 24 | 655 | 13885 |

TABLE 5-continued

Listing of some common wear metals found in used engine oils.

| Name of study testing | Amount of wear metals found in various used engine oils, mg/kg | | | | | |
|---|---|---|---|---|---|---|
| used engine oil | zinc | nickel | copper | chromium | iron | lead |
| Vazquez-Duhalt[4] | 1100 | 1 | 28 | 10 | N/A | N/A |
| ATSDR[5] | 480 | N/A | N/A | 6.5 | N/A | 240 |

N/A- data on specific wear metal not available
[1]Dominguez-Rosado & Pichtel, Chemical characterization of fresh, used and weathered motor oil via GC/MS, NMR and FTIR techniques. Proc. Indiana Acad. Sci. 2003;112(2): 109-116;
[2]Raymond, et al., Oil degradation in soil. App. Envir. Microbiol. 1975; 31:522-35;
[3]Cotton, et al., Analysis of 30 used motor oils. Hydrocarb. Process. 1977; 131-140;
[4]Vazquez-Duhalt, Environmental impact of used motor oil. Sci. Total Envir. 1989;79:1-23;
[5]Agency for Toxic Substances and Disease Registry, Toxicological profile for used mineral-based crankcase oil. 1997; U.S. Dept Health Human Services, Public Health Service, Atlanta, GA.

The RREO exhibits a stiff paste-like consistency with minimal change in Penetration over a wide temperature range, from 39.2° F.-115° F.

Example 2

Re-refined engine oil was obtained from a supplier and RREO oxidation was performed using an internal high shear mixer for 1 to 7 hours, high shear mixing, and temperature of 500±10° F. Air was injected as described in Example 1, and an $N_2$ blanket was used. The results are summarized in Table 6.

TABLE 6

Results of Oxidation of RREO from Supplier II (located in the Southeast).

| Properties | | ASTM Test Method | Results | Comments |
|---|---|---|---|---|
| Mixing Process | | | | |
| Temperature, ° F. | | Probe | 500 ± 10 | PRI procedure, Silverson laboratory high shear mixer |
| Time, hours | | To targeted end point | 4.5 | |
| RREO Before Processing | | | | |
| Flash Point, COC, ° F. | | D 92 | 565 | Flash Points differences by Test Method |
| Flash Point, PMCC, ° F. | | D 93 | 470 | |
| Composition, Component Fractions, % | Asphaltenes Polar Aromatics Naphthene Aromatics Saturates | D 4124 via Iatroscan | 2.6 44.7 0.0 52.7 | Typical composition of RREO exemplifies differences from different re-refiners |
| Softening Point, ° F. | | D 36 | — | Essentially a high viscosity liquid; becomes a semi-solid like material below 10° C. |
| Penetration, dmm | 39.2° F. | D 5 | — | |
| DSR, G*/sinδ, kPa | 4° C. 10° C. | D 7175 | 1.575 0.805 | |

TABLE 6-continued

Results of Oxidation of RREO from Supplier II (located in the Southeast).

| Properties | | ASTM Test Method | Results | Comments |
|---|---|---|---|---|
| After Processing | | | | |
| Softening Point, ° F. | | D 36 | 242 | Targets a high SP, which may be letdown to desired elastic modulus |
| Penetration, dmm | 39.2° F. | D 217 | 178 | Exhibits a highly desired uniform consistency, which exhibits minimal change with temperature |
| | 77° F. | | 224 | |
| | 115° F. | | 245 | |
| Solubility, TCE, % | | D 2042 | 99.3 | Homogeneity, purity |
| Rotational Viscosity, 300° F., cps | 10 rpm | D 4402 | 21,900 | Material is shear susceptible. Provides advantages in subsequent processing |
| | 50 rpm | | 4,740 | |
| | 100 rpm | | — | |
| Separation, 163° C., 48 hrs, SP, ° F. | Top ⅓ | D 7173/D 36 | 170 | Exhibits less homogeneity and stability than Source 1 |
| | Bottom ⅓ | | 182 | |
| | Difference, ° F. | | 12 | |
| DSR, G*/sinδ, kPa | 106° C. | D 7175 | 2.300 | Material classifies as a PG 118-XX if used in paving |
| | 100° C. | | 3.000 | |
| | 94° C. | | 3.700 | |

The second source of RREO exhibits a composition with significantly less Asphaltenes and significantly more Polar Aromatics. This RREO, when processed the same as in Example 1, exhibited similar properties. The Softening Point was significantly increased with corresponding decreases in Penetration. The Penetration values were lower (stiffer) than the source of RREO in Example 1, and as a result, exhibited a 30° F. higher Softening Point after processing. The RREO of Example 2, achieved a 242° F. Softening Point in 4.5 hours vs. the 212° F. Softening Point compared to Example 1, which required 7 hours of processing. As such, Example 2 would have a PG classification of PG 118-XX.

Example 3

Re-refined engine oil from a third supplier was obtained and RREO oxidation was performed using an internal high shear mixer at a temperature of 500±10° F. with high shear mixing. The system was set to a final Softening Point of 200+° F., which is universal in asphalt roofing shingle markets. Air was injected as described in Example 1, and $N_2$ blanket used. The results are summarized in Table 7.

TABLE 7

Results of Oxidation of RREO from Supplier III (located on the west coast).

| Properties | | ASTM Test Method | Results | Comments |
|---|---|---|---|---|
| Mixing Process | | | | |
| Temperature, ° F. | | Probe | 500 ± 10 | PRI procedure, Silverson laboratory high shear mixer |
| Time, hours | | To targeted end point | 9 | |
| RREO Before Processing | | | | |
| Flash Point, COC, ° F. | | D 92 | 505 | Flash Points differences by Test Method |
| Flash Point, PMCC, ° F. | | D 93 | 475 | |
| Composition, Component Fractions, % | Asphaltenes | D 4124 via Iatroscan | 8.5 | Typical composition of RREO. Exemplifies differences by refining source. Composition differs from those of Sources I and II. |
| | Polar Aromatics | | 28.2 | |
| | Naphthene Aromatics | | 0.0 | |
| | Saturates | | 63.3 | |
| Softening Point, ° F. | | D 36 | — | Too fluid to test |
| Penetration, dmm | 39.2° F. | D 5 | — | |
| DSR, G*/sinδ, kPa | 4° C. | D 7175 | — | |
| | 10° C. | | | |
| After Processing | | | | |
| Softening Point, ° F. | | D 36 | 208 | Targeted all market sectors |
| Penetration, dmm | 39.2° F. | D 217 | 222 | Exhibits a highly desired uniform consistency, which exhibits minimal change with temperature |
| | 77° F. | | 264 | |
| | 115° F. | | 280 | |
| Solubility, TCE, % | | D 2042 | 93.9 | Homogeneity, purity |
| Rotational Viscosity, 300° F., cps | 10 rpm | D 4402 | 17,800 | Material is shear susceptible. Provides advantages during subsequent processing. |
| | 50 rpm | | 4,400 | |
| | 100 rpm | | 2,450 | |

TABLE 7-continued

Results of Oxidation of RREO from Supplier III (located on the west coast).

| Properties | | ASTM Test Method | Results | Comments |
|---|---|---|---|---|
| Separation, 163° C., 48 hrs, SP, ° F. | Top ⅓ Bottom ⅓ Difference, ° F. | D 7173/D 36 | 204 208 4 | Exhibits slightly less homogeneity and stability than Source I |
| DSR, G*/sinδ, kPa | 106° C. 100° C. 94° C. | D 7175 | 1.520 1.980 2.400 | Material classifies as a PG 112-XX if used in paving |

The RREO from the third supplier source exhibited yet another composition which was more liquid at standard conditions and took longer to achieve the targeted Softening Point via the same process. Once the targeted Softening Point was achieved, the properties of the RREO exhibited the same benefits, namely high temperature stability with excellent low temperature properties, homogeneity, and only slight separation. Similar to Examples 1 and 2, Rotational Viscosities indicated a shear susceptible material.

Examples 4-8 illustrate the feasibility and some benefits when ground tire rubber (crumb rubber) is combined with the RREO and processed using the process described above, altering the temperature and times to adjust for the GTR components. These examples demonstrate the efficacy of GTR and RREO combination with three sources of RREO and two sources of GTR.

The combination provides synergistic and complementary benefits.

The oxidized RREO provides high temperature benefits, more Newtonian-type rheological profiles, while the GTR provides low temperature property improvement and the combination improved anti-aging properties.

Example 4

Collected re-refined (recycled) engine oils were transferred to a mixing vessel or tank as described in Example 1. The RREO was brought to a temperature of 5500±25° F. or 50° F. below the Flash Point as determined by ASTM D 92, Cleveland Open Cup Method or equivalent. As used herein RREOs can be re-refined oils or used oils that are collected and dehydrated. In the re-refining process, engine oils are collected from various sources, screened for potential hazardous materials and components, such as PCB's, etc., then dewatered, atmospherically distilled and then vacuum distilled, with the bottoms of the vacuum distillation referred to as RREO or REOB, re-refined engine oil bottoms or VTAE, vacuum tower asphalt extender. Used oils that are collected and dehydrated have lower flash point, in the range of 50-150° F., and therefore when used with GTR as described, process conditions should use the flash point for safe processing.

The RREO was mixed while air was injected at 0.1-2 L/min/kg. The reaction is a function of contact time of the RREO with air, so smaller bubbles with greater surface area are highly preferred, as is longer contact time. Preferably, air is injected as bubbles having a diameter of 0.125" or smaller. Additionally, it is preferred to use mechanical means to minimize bubble coalescence, such as a vertical still. A non-limiting example of such a vertical still has dimension 6' (dia.)×40 ft. (height) to 12' (dia.)×20' (height).

Increases in temperature from the values described in Examples 1-3 result in an increased rate of reaction, and corresponding decrease in process time. Measurements of oxidation levels in the RREO allow for adjustment of processing time, from 0.5 to 24 hours. However, in instances where RREO and GTR are jointly processed, in addition to the aforementioned parameters, internal and external circulation optimally incorporating a shear mill or digestion system facilitates the GTR size reduction, thereby enhancing the effect of the invention on asphalt binders. In determining the processing conditions, increases in temperature must be evaluated, as high temperatures can result in thermal decomposition of the GTR. RREO can be mixed with GTR at a ratio of 80% RREO to 20% GTR to 50% RREO to 50% GTR, which includes 60% RREO to 40% GTR. The GTR particles are 38 microns or less, providing large surface area for access to non-cross-linked (non-vulcanized) modular sites within the rubber particle.

Processing of the RREO or RREO and GTR to form a binder modifier should continue until the material:
achieves optimum dispersion of the GTR; and/or
Consistency/viscosity remains within desired ranges for standard means of pumping, typically using positive displacement or diaphragm pumps.

Upon reaching the desired consistency, viscosity and/or dispersion, the binder modifier, i.e. modified RREO+GTR, is added at a ratio of 80% of a standard asphalt or SBS-modified asphalt to 20% of the RREO+GTR binder modifier. The asphalt and RREO+GTR binder modifier material are mixed at 5500±25° F. or 50° F. below the flash point and applied to paving material or stored in a heated state for use in paving. Alternatively, the asphalt and RREO+GTR binder modifier material are mixed at cooler temperatures, such as 450° F., 400° F., or 50-80° F. below the flash point of the RREO.

Example 5

Collected RREO was transferred to a mixing vessel or tank as described in Example 1. The RREO was brought to a temperature of less than 450°±25° F., or at least 200° F. As used herein RREOs can be re-refined oils or used oils that are collected and dehydrated, as described in Example 4. The RREO was mixed while air was injected at 0.1-2 L/min/kg, as provided in Example 4. The reaction is dependent on RREO contact with air, thus smaller bubbles enhance contact time and reduce processing requirements. Further, due to the reduced temperatures, processing times will increase, though thermal degradation will also be correspondingly reduced. Measurements of oxidation levels in the RREO allow for adjustment of processing time, from 1 to 24 hours.

RREO can be mixed with GTR at a ratio of 80% RREO to 20% GTR to 50% RREO to 50% GTR, which includes 60% RREO to 40% GTR. The GTR particles are 38 microns or less, providing large surface area for access to non-cross-linked (non-vulcanized) modular sites within the rubber particle. Processing of the RREO or RREO and GTR to form a binder modifier should continue until the material:

achieves optimum dispersion of the GTR; and/or

Consistency/viscosity remains within desired ranges for standard means of pumping, typically using positive displacement or diaphragm pumps.

Upon reaching the desired consistency, viscosity and/or dispersion, the binder modifier, i.e. modified RREO+GTR, is added at a ratio of 80% of a standard asphalt or SBS-modified asphalt to 20% of the RREO+GTR binder modifier. The asphalt and RREO+GTR binder modifier material are mixed at a temperature of at least 400° F., or 450° F.±25° F. and applied to paver material or stored in a heated state for use in paver. Alternatively, the asphalt and RREO+GTR binder modifier material are mixed at cooler temperatures, such as 450° F., 425° F., or 400° F.

Example 6

A composition of re-refined engine oil (RREO) and ground tire rubber (GTR) was prepared. A vessel, tank or circulation loop was obtained possessing sufficient capacity to receive the selected amount of GTR via standard industry practices to include conveying, pneumatic injection or by directly dumping into the tank. In addition to the aforementioned heating capability, the vessel must be equipped with a combination of paddle agitation, high shear milling or mixing (Cowles), high velocity pump circulation, or other device designed to keep the GTR suspended and prevent settling out during the process. Preferably, the vessel will have paddle agitation, shear milling, and circulation.

The mixture of RREO and GTR was then reacted for the selected time to produce the desired admixture properties of viscosity, GTR particle size and GTR particle dispersion. In some embodiments, up to 40% GTR is mixed with the RREO. However, a higher percentage of GTR is possible. The consistency of the resulting material is dependent upon reaction parameters and type of rubber co-processed. For example, longer reaction times typically yield more oils, carbon black, and smaller GTR particulates. Reducing the GTR particle size to less than 38 microns provides greater surface area, exposing more non-cross-linked modular sites within the rubber particle (non-vulcanized). These sites may subsequently be cross-linked providing elastomeric properties.

The RREO from Example 1 was modified with GTR at a ratio of 80% RREO and 20% 40-mesh GTR. The internal high shear mixer was run for 2.8 hours with air injection at 450±10° F. The mix was $N_2$ blanketed and processed until the targeted Softening Point of 200° F.-240° F. for use in asphalt roofing was achieved. The results of the composition are shown in Table 8.

TABLE 8

Results of Oxidation of RREO from Supplier 1, Modified with 40 mesh GTR from Source A.

| Properties | | ASTM Test Method | Results | Comments |
|---|---|---|---|---|
| Mixing Process | | | | |
| Temperature, ° F. | | Probe | 450 ± 10 | PRI procedure, Silverson |
| RREO Addition Time, hours | | PRI | 0.4 | laboratory high shear mixer. |
| Time, hours | | To targeted end point | 2.8 | Temperatures adjusted for GTR oils |
| RREO + GTR Blend Before Processing | | | | |
| Composition, Component Fractions, % | Asphaltenes | D 4124 via Iatroscan | 12.5 | Composition of RREO before addition of GTR |
| | Polar Aromatics | | 25.5 | |
| | Naphthene Aromatics | | 0.0 | |
| | Saturates | | 62.0 | |
| RREO + GTR Blend After Processing | | | | |
| Flash Point, COC, ° F. | | D 92 | 480 | The oils in the GTR are released, |
| Flash Point, PMCC, ° F. | | D 93 | 465 | reducing the Flash Point of the blend |
| Softening Point, ° F. | | D 36 | 220 | Selected for use in all markets |
| Penetration, dmm | 4° C. | D 217 | 170 | Demonstrates the blended |
| | 25° C. | | 166 | products' uniform consistency |
| | 46.1° C. | | 196 | over a wide temperature range (Newtonian-like behavior) |
| Solubility, TCE, % | | D 2042 | 99.8 | Homogeneity, 425 µm GTR particles. GTR were reduced in size, finer than 1.5 µm |
| Rotational Viscosity, 300° F., cps | 10 rpm | | — | Too viscous for measurement |
| | 50 rpm | D 4402 | — | |
| | 100 rpm | | — | |
| Separation, 163° C., 48 hrs, SP, ° F. | Top 1/3 | D 7173/D 36 | 114 | Demonstrates elimination of the settling issues associated with 40 |
| | Bottom 1/3 | | 115 | mesh GTR when processed and |
| | Difference, ° C. | | 1.0 | blended with RREO |
| DSR, G*/sinδ, kPa | 106° C. | D 7175 | — | Exhibits lower DSR values due to |
| | 100° C. | | 1.260 | the GTR oils. |
| | 94° C. | | 1.530 | |

TABLE 8-continued

Results of Oxidation of RREO from Supplier 1, Modified with 40 mesh GTR from Source A.

| | Properties | | ASTM Test Method | Results | Comments |
|---|---|---|---|---|---|
| MSCR | 0.1 kPa | $J_{nr}$ % Recovery | 25° C. D 7405 | 0.0003 98.1 | Demonstrates the ability to impart resiliency (% Recovery) to the blended product without the use |
| | 3.2 kPa | $J_{nr}$ % Recovery | | 0.3 42.6 | of elastomers (SBS's) or cross-linking |

The addition of 2000 GTR reduced the processing time of RREO by approximately 600%. Further, the inclusion of GTR affected the properties of the resulting composition, including reducing the Flash Points due to the release of GTR oils. The GTR and RREO composition exhibited homogeneity without GTR settling and reduced the GTR particle size sufficiently (less than 1.5 µm) to achieve 99.8% Solubility.

The high temperature stiffness of this composition was slightly lower than the 100% RREO of Example 1, but still sufficient to achieve a PG 100-XX rating. The multiple stress creep recovery, MSCR, protocols indicated 35% Elastic Recovery at 3.2 kPa.

This product, if added to a neat PG paving binder, provides the ability to add GTR which does not settle, meets solubility requirements, does not lower the high temperature PG of host asphalt, and improves the host asphalt's low temperature properties.

Example 7

The RREO, from Example 1, was modified with GTR at a ratio of 60% RREO and 40% 40-mesh GTR. The internal high shear mixer was run for 3 hours at 450±10° F. with air injection. The composition was $N_2$ blanketed during the process as in the previous examples. Processing continued until the targeted 160° F.-170° F. (universal asphalt markets) was met. The results of composition testing are shown in Table 9.

TABLE 9

Results of Oxidation of RREO from Supplier 1, Modified with GTR from Source A.

| Properties | | ASTM Test Method | Results | Comments |
|---|---|---|---|---|
| Mixing Process | | | | |
| Temperature, ° F. | | Probe | 450 ± 10 | PRI procedure, Silverson laboratory high shear mixer |
| RREO Addition Time, hours | | PRI | 1.1 | |
| Time, hours | | To targeted end point | 2.1 | |
| RREO + GTR Blend Before Processing | | | | |
| Composition, Component Fractions, % | Asphaltenes | D 4124 via Iatroscan | 12.5 | Composition of RREO before addition of GTR |
| | Polar Aromatics | | 25.5 | |
| | Naphthene Aromatics | | 0.0 | |
| | Saturates | | 62.0 | |
| RREO + GTR Blend After Processing | | | | |
| Flash Point, COC, ° F. | | D 92 | 470 | The oils in the GTR are released, |
| Flash Point, PMCC, ° F. | | D 93 | 430 | reducing the Flash Points |
| Softening Point, ° F. | | D 36 | 165 | Targeted for use in all markets |
| Penetration, dmm | 4° C. | D 217 | 333 | Demonstrates the blended products' |
| | 25° C. | | 304 | uniform consistency over a wide |
| | 46.1° C. | | 331 | temperature range, 4° C. to 46° C. |
| Solubility, TCE, % | | D 2042 | 90.3 | Homogeneity, 40 mesh (425 µm) GTR was reduced in size |
| Rotational Viscosity, 300° F., cps | 10 rpm | | — | Too viscous for measurement |
| | 50 rpm | D 4402 | — | |
| | 100 rpm | | — | |
| Separation, 163° C., 48 hrs, SP, ° F. | Top 1/3 | D 7173/D 36 | 91 | Demonstrates elimination of the settling associated with 40 mesh GTR |
| | Bottom 1/3 | | 91 | |
| | Difference, ° C. | | 0 | |
| DSR, G*/sinδ, kPa | 70° C. | D 7175 | 0.91 | Exhibits slightly lower DSR values due to the GTR oils |
| | 65° C. | | 1.03 | |
| MSCR 0.1 kPa | $J_{nr}$ % Recovery | 25° C. D 7405 | 0.012 98.5 | Demonstrates the ability to impart resiliency (% Recovery) to the product without the use of other |

TABLE 9-continued

Results of Oxidation of RREO from Supplier 1, Modified with GTR from Source A.

| Properties | | ASTM Test Method | Results | Comments |
|---|---|---|---|---|
| 3.2 kPa | $J_{nr}$ % Recovery | | 0.819 35.2 | elastomeric polymers or cross-linking |

The resulting composition demonstrates the ability to process higher loadings of GTR, while still achieving homogeneity without settling. The addition of the added GTR (40%) released more GTR oils, which subsequently reduced the Softening Point and DSR values as expected. Additional processing time would increase these values proportionately. As in the previous examples, elastomeric properties were exhibited.

The product exhibited enhanced tack and stickiness. As such, this composition is useful in: host asphalts, such as paving binders, MB compounds in roofing, roofing and industrial peel-n-stick compounds, crack and joint sealants, roof coatings, cements, and mastics. The incorporation would greatly enhance a suite of performance properties.

Example 8

The RREO from Example 3 was modified with GTR at a ratio of 80% RREO and 20% 30-mesh GTR (Source B). The internal high shear mixer was run at 450±10° F. with air injection, until a targeted Softening Point of 200+° F. (universal asphalt markets) was met. The composition was N2 blanketed during the process, as in the previous samples. The results of the composition evaluations are shown in Table 10.

TABLE 10

Results of Oxidation of RREO from Supplies III, Modified with 30 mesh GTR from Source B

| Properties | | ASTM Test Method | Results | Comments |
|---|---|---|---|---|
| Mixing Process | | | | |
| Temperature, ° F. | | Probe | 450 ± 10 | PRI procedure, Silverson |
| RREO Addition Time, hours | | PRI | 0.3 | laboratory high shear mixer |
| Time, hours | | To targeted end point | 2.8 | |
| RREO + GTR Blend After Processing | | | | |
| Flash Point, COC, ° F. | | D 92 | 485 | The oils in the GTR are released, |
| Flash Point, PMCC, ° F. | | D 93 | 470 | reducing the Flash Points |
| Softening Point, ° F. | | D 36 | 221 | Targeted for use in all markets |
| Penetration, dmm | 4° C. | D 217 | 170 | Demonstrates the products' |
| | 25° C. | | 166 | consistency stability over a wide |
| | 46.1° C. | | 196 | temperature range |
| Solubility, TCE, % | | D 2042 | 99.8 | Homogeneity, particulate GTR was reduced in size sufficiently |
| Rotational Viscosity, 300°F, cps | 10 rpm 50 rpm 100 rpm | D 4402 | — — — | Too viscous for measurement |
| Separation, 163° C., 48 hrs, SP, ° F. | Top 1/3 Bottom 1/3 Difference, ° C. | D 7173/D 36 | 114 115 1.0 | Demonstrates elimination of the settling associated with 40 mesh GTR, size reduction of the GTR |
| DSR, G*/sinδ, kPa | 106° C. 100° C. 94° C. | D 7175 | — 1.260 1.530 | Exhibits a slightly lower DSR are value due to the GTR oils |
| MSCR 0.1 kPa | $J_{nr}$ % Recovery | 25° C. | D 7405 | 0.0003 98.1 0.03 | Demonstrates the ability to impart resiliency (% Recovery) to the product without the use of virgin |
| 3.2 kPa | $J_{nr}$ % Recovery | | | 42.6 | SBS or cross-linking |

In Example 8, the third RREO source was combined with a second source (b) of GTR. The results are similar to the results of Example 6, using RREO from Source 1 and GTR form Source 1 (a). The compound's stiffness, G*, is increased, and the rheological properties are more Newtonian, exhibiting similar consistency over a wide temperature range. Homogeneity and non-settling of the GTR was achieved, and elastomeric properties were gained.

The process time was significantly reduced with the GTR when compared to the 100% RREO, Source III data, shown in Example 3. This is consistent with other testing, and an important finding, as the "wear metals" indigenous to RREO currently available are believed to act as reaction catalysts, though other actions may be affecting the reactions. The process efficiencies are functions of the type and quantity of "wear metals" present in RREO and possibly the quantity of GTR.

Example 9

The binder modifier formed in Example 1 was added to various paving asphalts, which are not limited by grade, type, or composition at 0.5 wt % or 5 wt %, depending on the requirements of the end product. The admixture is completely miscible, yielding homogenous, stable blended asphalt. The new blended paving binder was immediately usable and complies with current specification enhanced performance properties.

TABLE 11

Benefits of blending 10% RREO (see Table 4) with 90% PG 58-16.

| Property | | | ASTM Test Method | Results PG 58-16 Neat | 90/10 Blend |
|---|---|---|---|---|---|
| Original Binder, As Received | | | | | |
| DSR, G*/sin δ, kPa | | 58° C. | D 7175 | 1.231 | 1.963 |
| PAV Residue (20 hrs. 300 psi, 100° C.) | | | | | |
| Creep Stiffness | m Value | 6° C. | D 6648 | 0.308 | 0.314 |
| | Stiffness, MPa | | | 284 | 179 |
| Continuous PG Effective Temperature Range, ° C. | | | D 6373 Calculation | 58.2-16.2 74.4 | 63.5-24.3 87.8 |

The modified asphalt material properties, seen in Table 11, demonstrates the improvement in both the high and low temperature properties when using oxidized RREO from Example 1 blended with a conventional PG neat binder. The overall PG was improved by nearly one high temperature grade and more than one low temperature grade. The Effective Temperature Range increased by 13.4° C.

Example 10

The binder modifier formed in Example 6 was added to various paving asphalts, which are not limited by grade, type, or composition at 0.5 wt % or 5 wt %, depending on the requirements of the end product. The admixture is completely miscible, yielding homogenous, stable blended asphalt. The new blended paving binder was immediately usable and complies with current specification enhanced performance properties, as seen in Table 12.

TABLE 12

Benefits of Blending RREO + GTR Admixture (see Table 8) with Standard Air Blown Shingle Coating. The blend used was 80% air blown shingle coating + 20% RREO + GTR processed blend.

| Property | | | ASTM Test Method | Results Air Blown Shingle Coating | 80/20 Blend |
|---|---|---|---|---|---|
| Original/As Blended | | | | | |
| Softening Point, ° F. | | | D 36 | 210 | 211 |
| Elastic Recovery, % | | 25° C. | D 6084 | Broke @ 2.6 cm | 13.3 |
| Separation, SP Difference, ° F. | | | D 7173 | 1.0 | 1.0 |
| MSCR, $J_{nr}$ | | 60° C. | D 7405 | 0.0021 | 0.0014 |
| Sag, 0.1 mm | | 140° F. | D 4526 | 0.0 | 0.0 |
| Creep Stiffness | m Value | −12° C. | D 6648 | 0.275 | 0.304 |
| | Stiffness, MPa | | | 90.7 | 39.5 |

The roofing blend demonstrates the utility of RREO+GTR admixture. The high temperature properties, evaluated by Softening Point, remained the same (210° F. vs. 211° F.), while the low temperature properties were improved as measured by Creep Stiffness. Additionally, the blended product exhibited approximately 13% Elastic Recovery due to the GTR component vs. no Elastic Recovery for the neat air blown shingle coating.

When 60% mineral filler was added to the two (2) coatings, the filled coating exhibited the properties noted in Table 13.

TABLE 13

Beneficial Properties of Prototype Filled Shingle Coatings.

| Property | | ASTM Test Method | Results | |
|---|---|---|---|---|
| | | | Air Blown Shingle Coating 40% + 20% Mineral Filler | 80/20 Blend Shingle Coating 40% + 60% Mineral Filler |
| Original/As Blended | | | | |
| Penetration, dmm | 4° C. | D 5 | 4 | 16 |
| | 25° C. | | 10 | 16 |
| | 46.1° C. | | 17 | 20 |
| Separation, SP Difference, ° F. | | D 7173 | 22 | 6 |
| Creep Stiffness | m Value  −12° C. | D 6648 | 0.254 | 0.276 |
| | Stiffness, MPa | | 445 | 192 |

The properties demonstrate a filled coating to be less elastic at low temperatures. Both the Penetration values and Creep Stiffness values provide comparative improvements of the 80/20 Filled Coating. Filler settling and measured Separation, indicated filler settling was retarded.

The 80/20 Filled Coating was added to the MB (modified bitumen coating employing plastomeric modifiers such as EVA and PE) used in commercial roofing products. Improved low temperature and elastomeric properties were confirmed. These properties are typically not found in asphalts modified with plastomers in either the roofing or paving sectors.

Additionally, the admixture improved adhesion properties to include aggregates. Initial tack and improved water sensitivity were identified. Elastomeric properties as determined by AASHTO TP 19, ASTM D 6084, and other test methods quantifying Elastic Recovery and recoverable strain were improved.

Performance improvements without an accompanying increase in viscosity are typically associated with polymer modifiers such as SBS polymers or Poly phosphoric Acid (PPA). SBS polymer and Poly phosphoric Acid (PPA) when added to bitumen, increase the Rotational Viscosity and Dynamic Shear Rheology, G*/sin δ, as measured by ASTM D 4402 and AASHTO T 315, respectively. The increases are proportionate with dosage and may result in a non-compliance with binder specifications like AASHTO M 320, Table 4. Similarly, the viscosity increase may be exhibited in asphalt binders governed by ASTM D 946, Penetration-Graded bitumen and/or ASTM D 3381, Viscosity-Graded bitumen.

Testing of the admixture-asphalt binder provided improved low temperature properties, while preserving or only minimally effecting the high temperature properties.

Example 11

The binder modifier formed in Example 3 was combined with paving aggregates to make a cold patch compound without the use of asphalt of any type. The admixture is completely miscible, yielding homogenous, stable blended asphalt. The compound consists of 96% No. 4 Trap Rock Aggregate combined with 4% processed RREO. The new blended paving binder was immediately usable and complies with current specification enhanced performance properties

TABLE 14

Properties of the Prototype Cold Patch Compound.

| Property | | ASTM Test Method | Results |
|---|---|---|---|
| Workability | 10° C. | D 6704, Atl. 1 | 24.5 |
| | 25° C. | | 26 |
| | 40° C. | | 23 |
| Expected Shelf Life, lbs (Dark Oven Aged for 7 days @ 60° C.) | 10° 25° C. 40° C. | D 5869 (DOA)/D 6704 | 157 73 59 |
| Rut Resistance, cycles (After Dark Oven Aged for 7 days) | 60° C. | AASHTO T 341 | 11.8 mm depth @ 2,210 cycles |
| Marshall Stability (50 blows), lbs. | | D 6927 | 1,373 |
| Effect of Water on Marshall Stability, % (After 7 days @ 60° C.) | | AI, MS-14, Appendix | 94.3% retained strengths |

The evaluation results on the prototype cold patch materials indicated a workable rut resistance product during and after application, as seen in Table 14. The cured patch exhibited standard pavement type Marshall Stabilities and exhibited excellent aggregate adhesion and Marshall Stability after water conditioning.

Example 12

A prototype ASTM D 6690, *Joint and Crack Sealant, Hot-Applied for Concrete and Asphalt Pavements*, was produced using 80% of a standard SBS-modified asphalt suitable for this purpose and 20% of RREO+GTR from Example 4.

The prototype met the requirement of Type I. The prototype formula provides a significant raw material cost savings, while improving adhesion to both fractured asphalt and concrete pavements.

Example 13

RREO–GTR admixture was prepared for roofing applications. The RREO was oxidized as discussed in Example 5, and incorporated into roofing asphalt, such as base asphalt either diluted with a distillate, cutback (CB), or emulsified asphalt. Testing showed the admixture improved base asphalt for use in cutbacks, which then provided improved performance properties, adhesion, flexibility, and weatherability (resistance to cracking). Further, the admixture improved the base asphalt for use in asphalt emulsions, which then provided improved performance properties: adhesion, flexibility, and weatherability (resistance to cracking).

For steep slope shingles, and air blown coatings, the RREO was oxidized as discussed in Example 5, and incorporated into roofing asphalt, resulting in lubricating properties facilitating product manufacturing without altering high temperature properties, such as Softening Point. The lower viscosity of the coating facilitated processing and blending with filler. The admixture may also be added to flux and subsequently oxidized to coating.

The admixture-asphalt showed an improved Softening Point, as determined by ASTM D 36, and Penetration, based on ASTM D 5 relationships, as well as a high Penetration value at a given Softening Point. Further, the coating exhibited elastomeric properties seen in Example 5.

Exposure of the coating to accelerated weathering showed the admixture improved resistance to weathering as evaluated by ASTM D 4798, including mass loss and pinholes/crack formation (ASTM D 1670). Shingle coating with the RREO or RREO–GTR combination exhibited improved flexibility measured by ASTM D 5147.

In low slope and commercial roofing, and for use with modified bitumen compounds, the admixture provided complementary properties to conventional MB compounds, such as maintained performance, while reducing polymer content of compounds modified with elastomers. Further, in compounds modified with plastomers, the admixture provides a means to co-modify the composition to provide low temperature and elastomeric properties.

Other variations of usage for the asphalt compositions may be apparent to one skilled in the art.

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between. Now that the invention has been described, Applicant claims the following.

What is claimed is:

1. A modifier for asphalt comprising re-refined engine oil, ground tire rubber and at least one plastomer and/or at least one elastomer, wherein the re-refined engine oil and ground tire rubber are oxidized by heating the re-refined engine oil and ground tire rubber to a temperature of about 150° F. to about 550° F. or to 50° F. below the flash point of the re-refined engine oil and injecting air into the re-refined engine oil and ground tire rubber while mixing, wherein after oxidation the modifier has a softening point of at least 150° F. and penetration values that vary by 75 decimillimeters or less when measured at about 39° F. and about 115° F.

2. The modifier of claim 1, wherein the modifier is oxidized prior to the addition of the at least one plastomer and/or at least one elastomer.

3. The modifier of claim 1, wherein the at least one plastomer and/or at least one elastomer is added prior to oxidation of the re-refined engine oil and ground tire rubber.

4. The modifier of claim 2, wherein the at least one elastomer is selected from the group consisting of styrene-butadiene-styrene, styrene-isoprene-styrene, styrene-butadiene rubber, styrene-butadiene polymer, styrene-ethylene-butadiene-styrene, reactive polymers, ter-polymers, natural rubbers or combinations thereof.

5. The modifier of claim 3, wherein the at least one elastomer is selected from the group consisting of styrene-butadiene-styrene, styrene-isoprene-styrene, styrene-butadiene rubber, styrene-butadiene polymer, styrene-ethylene-butadiene-styrene, reactive polymers, ter-polymers, natural rubbers or combinations thereof.

6. The asphalt modifier of claim 2, wherein the at least one plastomer is selected from the group consisting of polyethylene, ethylene-vinyl-acetate, APO, amorphous polyolefin, or APP, or a combination thereof.

7. The asphalt modifier of claim 3, wherein the at least one plastomer is selected from the group consisting of polyethylene, ethylene-vinyl-acetate, APO, amorphous polyolefin, or APP, or a combination thereof.

8. The asphalt modifier of claim 3, wherein the at least one plastomer is polyethylene.

9. An asphalt modifier emulsion comprising re-refined engine oil, ground tire rubber, and water, wherein the re-refined engine oil and ground tire rubber are oxidized by heating the re-refined engine oil and ground tire rubber to a temperature of about 150° F. to about 550° F. or to 50° F. below the flash point of the re-refined engine oil and injecting air into the re-refined engine oil and ground tire rubber while mixing, wherein after oxidation the modifier has a softening point of at least 150° F. and penetration values that vary by 75 decimillimeters or less when measured at about 39° F. and about 115° F.

10. The asphalt modifier emulsion of claim 9, further comprising at least one elastomer and/or at least one plastomer.

11. A The asphalt modifier emulsion of claim 10, wherein the at least one elastomer is selected from the group consisting of styrene-butadiene-styrene, styrene-isoprene-styrene, styrene-butadiene rubber, styrene-butadiene polymer, styrene-ethylene-butadiene-styrene, reactive polymers, ter-polymers, natural rubbers or combinations thereof.

12. The asphalt modifier of claim 10, wherein the at least one plastomer is selected from the group consisting of polyethylene, ethylene-vinyl-acetate, APO, amorphous polyolefin, or APP, or a combination thereof.

13. The asphalt modifier of claim 12, wherein the at least one plastomer is polyethylene.

14. The asphalt modifier of claim 12, wherein the re-refined engine oil and ground tire rubber are oxidized by heating the re-refined engine oil and ground tire rubber to a temperature of about 150° F. to about 550° F. or to 50° F. below the flash point of the re-refined engine oil and injecting air combined with inert gas into the re-refined engine oil and ground tire rubber while mixing.

15. The asphalt modifier of claim 14, wherein the inert gas is nitrogen.

16. A modifier for asphalt comprising re-refined engine oil, ground tire rubber and at least one wax, wherein the re-refined engine oil and ground tire rubber are oxidized by heating the re-refined engine oil and ground tire rubber to a temperature of about 150° F. to about 550° F. or to 50° F. below the flash point of the re-refined engine oil and injecting air into the re-refined engine oil and ground tire rubber while mixing, wherein after oxidation the modifier has a softening point of at least 150° F. and penetration values that vary by 75 decimillimeters or less when measured at about 39° F. and about 115° F.

17. A modifier for asphalt comprising re-refined engine oil, ground tire rubber and at least one polymer, wherein the re-refined engine oil and ground tire rubber are oxidized by heating the re-refined engine oil and ground tire rubber to a temperature of about 150° F. to about 550° F. or to 50° F. below the flash point of the re-refined engine oil and injecting air into the re-refined engine oil and ground tire rubber while mixing, wherein after oxidation the modifier has a softening point of at least 150° F. and penetration values that vary by 75 decimillimeters or less when measured at about 39° F. and about 115° F.

18. The modifier of claim 17, wherein the at least one polymer includes at least one recycled polymer.

* * * * *